United States Patent
Cherches et al.

(10) Patent No.: US 12,524,269 B2
(45) Date of Patent: Jan. 13, 2026

(54) STACK MEMORY ALLOCATION CONTROL BASED ON MONITORED ACTIVITIES

(71) Applicant: TEXAS INSTRUMENTS INCORPORATED, Dallas, TX (US)

(72) Inventors: Barak Cherches, Ramat Ha'Kovesh (IL); Shaul Barner, Shoham (IL); Yaron Alpert, Hod Hasharon (IL)

(73) Assignee: Texas Instruments Incorporated, Dallas, TX (US)

( * ) Notice: Subject to any disclaimer, the term of this patent is extended or adjusted under 35 U.S.C. 154(b) by 898 days.

(21) Appl. No.: 17/197,746

(22) Filed: Mar. 10, 2021

(65) Prior Publication Data
US 2022/0291962 A1    Sep. 15, 2022

(51) Int. Cl.
G06F 9/50    (2006.01)
G06F 9/30    (2018.01)
G06F 11/07   (2006.01)
G06F 12/02   (2006.01)

(52) U.S. Cl.
CPC .......... *G06F 9/5016* (2013.01); *G06F 9/3004* (2013.01); *G06F 9/3009* (2013.01); *G06F 11/073* (2013.01); *G06F 11/0772* (2013.01); *G06F 12/0246* (2013.01)

(58) Field of Classification Search
None
See application file for complete search history.

(56) References Cited

U.S. PATENT DOCUMENTS

| | | | | |
|---|---|---|---|---|
| 4,758,944 A * | 7/1988 | Bartley | ................. | G06F 12/023 711/171 |
| 5,339,411 A * | 8/1994 | Heaton, Jr. | ........... | G06F 12/023 711/171 |
| 7,587,566 B2 * | 9/2009 | Ballantyne | ............ | G06F 12/126 711/170 |
| 7,996,629 B2 * | 8/2011 | Wan | ...................... | G06F 12/109 711/147 |
| 8,056,081 B2 * | 11/2011 | Mathur | ................. | G06F 9/5016 718/104 |

(Continued)

OTHER PUBLICATIONS

Song et al. "An Efficient Stack Management by The Selective Revocation of Mapping from Virtual Memory to Physical memory", IEEE 2020, 3 pages.*

(Continued)

*Primary Examiner* — Van H Nguyen
(74) *Attorney, Agent, or Firm* — Xianghui Huang; Frank D. Cimino

(57) ABSTRACT

An integrated circuit includes: a processor; a memory coupled to the processor; and a stack memory allocation controller coupled to the processor and the memory. The stack memory allocation controller has: a stack use manager configured to monitor activities of the processor. The stack memory allocation controller also has a virtual memory translator configured to: obtain a first mapping of pointers to a first sub-set of memory blocks of the memory assigned to a memory stack for a thread executed by the processor; and determine a second mapping of pointers to a second sub-set of memory blocks of the memory assigned to the memory stack and different than the first sub-set of memory blocks responsive to the monitored activities.

21 Claims, 4 Drawing Sheets

(56) References Cited

U.S. PATENT DOCUMENTS

| | | | | |
|---|---|---|---|---|
| 8,407,528 B2* | 3/2013 | Larson | .................. | G06F 11/364 |
| | | | | 714/45 |
| 9,274,840 B2* | 3/2016 | Dawson | ................ | G06F 9/5016 |
| 9,411,715 B2* | 8/2016 | Susnea | .................... | G06F 8/443 |
| 9,760,388 B1* | 9/2017 | Dass | .................... | G06F 9/45558 |
| 11,494,297 B2* | 11/2022 | Jain | ........................ | G06F 9/5022 |
| 2005/0198464 A1* | 9/2005 | Sokolov | ................ | G06F 12/145 |
| | | | | 711/170 |
| 2009/0210649 A1* | 8/2009 | Wan | .................... | G06F 9/30087 |
| | | | | 711/170 |
| 2014/0282583 A1* | 9/2014 | Dawson | ................ | G06F 9/5016 |
| | | | | 718/104 |
| 2021/0103473 A1* | 4/2021 | Lin | ........................ | G06N 3/045 |

OTHER PUBLICATIONS

Sun et al. "Improvement of Multimedia Performance Based on 3-D Stacking Memory Architecture and Software Refinement", IEEE Jun. 2020, pp. 0618-1623.*

* cited by examiner

STACK MEMORY ALLOCATION CONTROL BASED ON MONITORED ACTIVITIES

BACKGROUND

As new electronic devices are developed and integrated circuit (IC) technology advances, new IC products are commercialized. One example IC product includes a processor and memory, where the processor is configured to execute different threads. For such ICs, there are limited memory resources and strict power limitations, resulting in a need to improve memory utilization and reduce power consumption. Usually in an operating system (OS) environment, stack memories of tasks/threads (e.g., OS tasks) are one of the major memory consumers. As used herein, "stack memory" refers to a region of RAM memory that is used by a processor to store temporary data during execution of a specific task. The temporary memory allocation is managed in a last-in-first-out (LIFO) manner and is critical for the proper execution of the processor.

One of the challenges involved with processor-based ICs is managing the small amount of available memory resources in a way that will maximize performance (e.g. speed, power consumption, etc.) and yet maintain system programming transparency, simplicity of development, and robustness of the system. Random-access memory (RAM), allocated for a specific stack memory of a processor or OS task (when an OS is used), is a kind of memory whose peak consumption is not used most of the time. The way RAM is used serves as common attack liability.

In modern ICs where the OS is integrated, an example software program may execute about 10-20 simultaneous tasks/threads and needs to allocate memory to each stack of all these OS tasks. The memory allocated to each OS task stack is usually larger than the maximum estimated memory needed during peak consumption. If the stack is not large enough, then data may flow out of the stack boundary and override a stack (or other memory region) belonging to another task. The stack overflow scenario can be used by an attacker to gain control over a program. Due to the complexity of calculating the peak consumption and due to security and robustness considerations, programmers allocate much more memory than what is actually needed to protect against memory overflow. As a result, less overall memory is available for program execution, or increased memory size and cost are needed. Another issue is that non-consecutive memory allocation prevents powering off memory blocks.

SUMMARY

In at least one example, an integrated circuit comprises: a processor; a memory coupled to the processor; and a stack memory allocation controller coupled to the processor and the memory. The stack memory allocation controller has a stack use manager configured to monitor activities of the processor. The stack memory allocation controller also has a virtual memory translator configured to: obtain a first mapping of pointers to a first sub-set of memory blocks of the memory assigned to a memory stack for a thread executed by the processor; and determine a second mapping of pointers to a second sub-set of memory blocks of the memory assigned to the memory stack and different than the first sub-set of memory blocks responsive to the monitored activities.

In another example, a stack memory allocation controller comprises: a first interface adapted to be coupled to a memory interface between a processor and a memory; a stack use manager coupled to the first interface and configured to monitor activities of the processor; and a virtual memory translator coupled to the stack use manager. The virtual memory translator is configured to: obtain a first mapping of pointers to a first sub-set of memory blocks of the memory assigned to a memory stack for the thread; and determine a second mapping of pointers to a second sub-set of memory blocks of the memory assigned to the memory stack and different than the first sub-set of memory blocks responsive to the monitored activities.

In yet another example, a method comprises initiating, by a processor, a thread. The method also comprises monitoring activities of the processor, and managing virtual memory space to allocate or release physical memory blocks of a memory to the stack responsive to the monitored activities.

BRIEF DESCRIPTION OF THE DRAWINGS

The same reference numbers are used in the drawings to depict the same or similar features.

DETAILED DESCRIPTION

Figure 1:
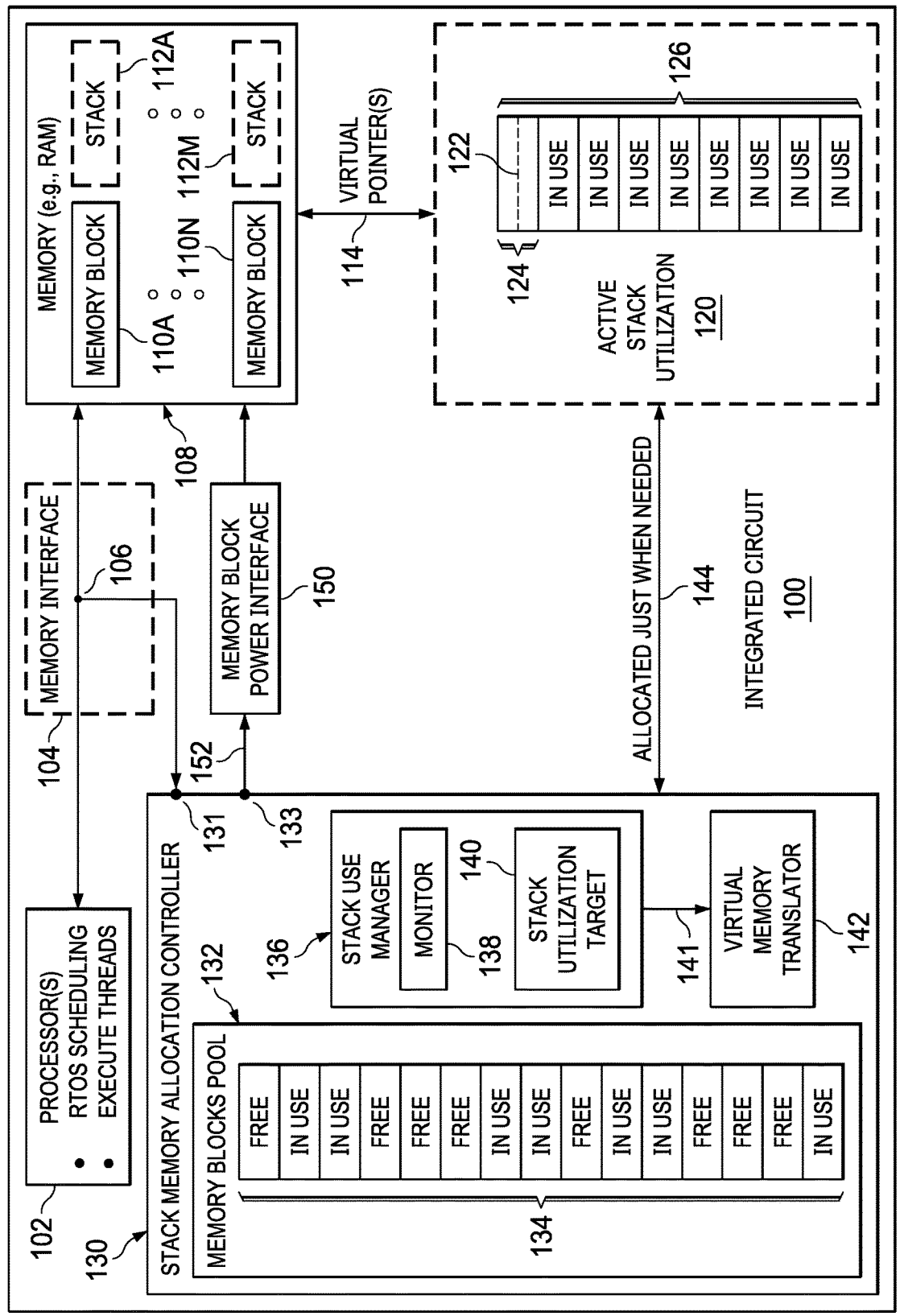
FIG. 1 is a block diagram of an integrated circuit in accordance with an example embodiment.

In this description, an integrated circuit (IC) or system includes a memory stack allocation controller configured to manage memory stack utilization for threads or tasks executed by a processor. With the memory stack allocation controller, the minimal size memory to handle stacks for threads (e.g., operating system (OS) threads or other tasks) can be dynamically and transparently updated based on current need. As desired, multi-thread operation policies are determined, while maintaining security restrictions and power consumptions optimizations.

With the memory stack allocation controller, the dynamic per thread memory allocation and total memory resources allocated for all stack memories are optimized. The memory stack allocation controller also protects against stack overflows, which improves security vulnerabilities and robustness issues. Regarding security and robustness, a general stack overflow event typically causes a program crash. In an embedded system, such as an IC, where the system might be standalone sometimes there is no user to handle this crash. Accordingly, a program crash may lead to malfunction or temporary unavailability of the system. Such crashes may also cause higher power consumption due to recovery flows. In addition, stack overflows are sometimes an attack avenue, which can lead to security vulnerabilities. In the described technique, the memory stack allocation controller prevent overflows and even could prevent, in some cases, a "return oriented programming" attack from buffer overrun on the stack itself (inside the boundary of the stack) by clearing or zeroing unused blocks.

In some example embodiments, the memory stack allocation controller also reduces power consumption (e.g., during low power or deep sleep modes) by powering down all memory blocks that are not in use. In some example embodiments, the memory stack allocation controller is configured to share (e.g., by dynamic allocation based on thread activity) some memory blocks among different threads, where monitored activities are used to determine the temporary minimal stack size needed by each thread. In one example embodiment, the monitored activities includes stack pointer information of one or more stack pointers. Additionally or alternatively, the monitored activities include operating system (OS) context switches. By adjusting the memory blocks assigned to a stack based on current need, the memory stack allocation controller protects against stack overflows. As desired, clearing or zeroing previously used memory blocks of a stack is performed to protect content.

With conventional approaches, there is no dynamic usage awareness of threads nor power efficient methodology for allocating and managing stack memory regions of processor tasks (e.g., OS tasks/threads). In contrast, with the described memory stack allocation controller, memory allocation and total memory usage is optimized while achieving programming transparency and simplicity. In some example embodiments, the memory stack allocation controller is able to adapt dynamically to provide need based, optimal, overflow protected allocation that allows sharing of memory blocks in a transparent way. In some example embodiments, the memory stack allocation controller manages allocation of random-access memory (RAM) memory blocks for stacks between different processor tasks in an adaptive dynamic ("on the fly") and secure way. This enables efficient utilization of RAM memory and avoidance of unnecessary (i.e., unused) memory allocations due to rare peak consumptions. With stack overflow protection, the memory stack allocation controller avoids data corruption and severe security breaches (e.g., an attacker gaining control over the program and executing carefully chosen machine instruction sequences that are already present in the machine's memory) since a thread can access a memory range allocated by the memory stack allocation controller. In some example embodiments, the memory stack allocation controller also reduces power consumption by powering down memory blocks based on need and powering down unused memory blocks in a transparent way. If the powered down memory blocks are needed later, the memory stack allocation controller is able to power up memory blocks in a transparent way.

FIG. 1 is a block diagram of an integrated circuit (IC) 100 in accordance with an example embodiment. As shown, the IC 100 includes processor(s) 102 coupled to a memory 108 (e.g., RAM memory) via a memory interface 104. In the example of FIG. 1, the processor(s) 102 perform real-time operating system (RTOS) scheduling, thread execution, and/or other operations. In some example embodiments, the processor(s) 102 includes a microcontroller (MCU) configured to perform RTOS scheduling and execution of threads. The memory interface 104 is also coupled to a first interface 131 of a stack memory allocation controller 130, which is configured to perform stack memory management operations for the IC 100. In other examples, the first interface 131 of the stack memory allocation controller 130 is coupled to and in communication with the processor 102 and/or the memory 108. In the example of FIG. 1, the IC 100 also includes a memory block power interface 150 coupled to a second interface 133 of the stack memory allocation controller 130 and to the memory 108.

As shown, the memory 108 includes memory blocks 110A-110N, which are allocated to stacks 112A-112M for threads or tasks executed by the processor(s) 102. In different example embodiments, sub-sets of the memory blocks 110A-110N are assigned to each of the stacks 112A-112M over time. In the example of FIG. 1, the stack memory allocation controller 130 includes a memory blocks pool 132 or data structure, which tracks the current status 134 (e.g., "free" or "in use") of the memory blocks 110A-110N. The stack memory allocation controller 130 also includes a stack use manager 136, which determines how the memory blocks 110A-110N are allocated to the stacks 112A-112M. In some example embodiments, the stacks 112A-112M are related to different threads being executed sequentially by the processor(s) 102. In other example embodiments, the stacks 112A-112M are related to different threads being executed in parallel by the processor(s) 102. Regardless of whether the threads are executed by the processor(s) 102 sequentially or in parallel, the stack use manager 136 monitors activities related one or more of the stacks 112A-112M using a monitor 138.

In some example embodiments, the monitor 138 is able to determine the amount of memory blocks 110A-110N that each active thread currently needs for its respective stack. One way to determine current need is to monitor a stack pointer, which is a register that stores the address of the last request in a stack. In some example embodiments, each processor core has a stack pointer for the active task and a stack pointer for interrupts (on OS context switch the stack pointer value is changed to reflect the status of the new active task). Change of the stack pointer value determines the boundary of used stack associated with the active stack. Tracking this value provide the information that the stack memory allocation controller needs in order to allocate memory blocks. Another implementation option is to track context switches of the operating system. In some example embodiments, responsive to each context switch, the stack memory allocation controller releases unused blocks from the stack allocated to the task that just finish execution and allocates all free blocks to the task that is going to be executed. In this way the active task will have the maximum possible allocated memory, and on finishing execution (e.g., during a context switch) will be left only with the amount that it needs.

In some example embodiments, the stack use manager 136 also includes a stack utilization target 140, which adds some utilization rules or targets regarding how the memory blocks 110A-110N will be allocated to each of the stacks 112A-112M. In some example embodiments, the stack utilization target 140 limits the number of memory blocks 110A-110N assigned to a thread responsive to a current need determined from the monitored activities. As another option, the stack utilization target 140 defines some of the memory blocks 110A-110N as sharable for the different stacks 112A-112M or related threads. As another option, the stack utilization target 140 defines some of the memory blocks 110A-110N as non-sharable. In such case, the non-sharable memory blocks are assigned to the different stacks 112A-112M or related threads even if the threads are not currently active.

As shown in FIG. 1, the stack memory allocation controller 130 also includes a virtual memory translator 142 coupled to or otherwise in communication with the stack use manager 136. In operation, the stack use manager 136 uses the monitored activities obtained by the monitor 138, the stack utilization target 140, and the current status 134 of the memory blocks 110A-110N maintained by the memory blocks pool 132 to provide memory block allocation instructions 141 to the virtual memory translator 142. In some example embodiments, the virtual memory translator 142 is configured to obtain a first mapping of pointers to a first sub-set of the memory blocks 110A-110N assigned to one of the stacks 112A-112M for a given thread. The first mapping may be obtained from default map settings, monitored activities of the processor(s) 102, and/or the stack utilization target 140. The virtual memory translator 142 is also configured to determine a second mapping of pointers to a second sub-set of memory blocks assigned to the memory stack and different than the first sub-set of memory blocks responsive to the monitored activities. For the second mapping, the virtual memory translator 142 supports an active stack utilization 120 with a memory block index 126 of "in use" memory blocks. With the virtual memory translator 142, the memory block index 126 is mapped to physical memory blocks (some of the memory blocks 110A-110N) using virtual pointers 114, where the physical memory blocks may be in a sequential address order or spaced from each other.

In some example embodiments, the allocation 144 of memory blocks by the stack memory allocation controller 130 to provide the active stack utilization 120 is performed just when needed to ensure the stack has enough memory for its current needs. As desired, an extra memory block 124 or some portion 122 of an extra memory block is included with the memory block index 126. The extra memory block 124 or portion 122 is intended to provide some flexibility to the thread while managing memory block use strategically to avoid significant re-allocation overhead. If needed, the extra memory block 124 or portion 122 is re-assignable to another stack responsive to thread prioritization or weights. Such prioritizations or weights may be included with the stack utilization target 140.

In some example embodiments, the stack memory allocation controller 130 is configured to provide a control signal 152 to the memory block power interface 150 to change the power state of memory blocks 110A-110N in accordance with the allocation of the memory blocks 110A-110N to the stacks 112A-112M. In one example, a second mapping results in a second sub-set of the memory blocks for a given stack that includes more memory blocks than a first-sub-set of the memory blocks for the given stack. In such case, the stack memory allocation controller 130 is configured to provide a first type of the control signal 152 to the memory block power interface 150, where the first type of the control signal 152 indicates a number of memory blocks to turn on. In response to the first type of the control signal 152, the memory block power interface 150 is configured to change a power state of at least one of the memory blocks 110A-110N from off to on.

Figure 2:
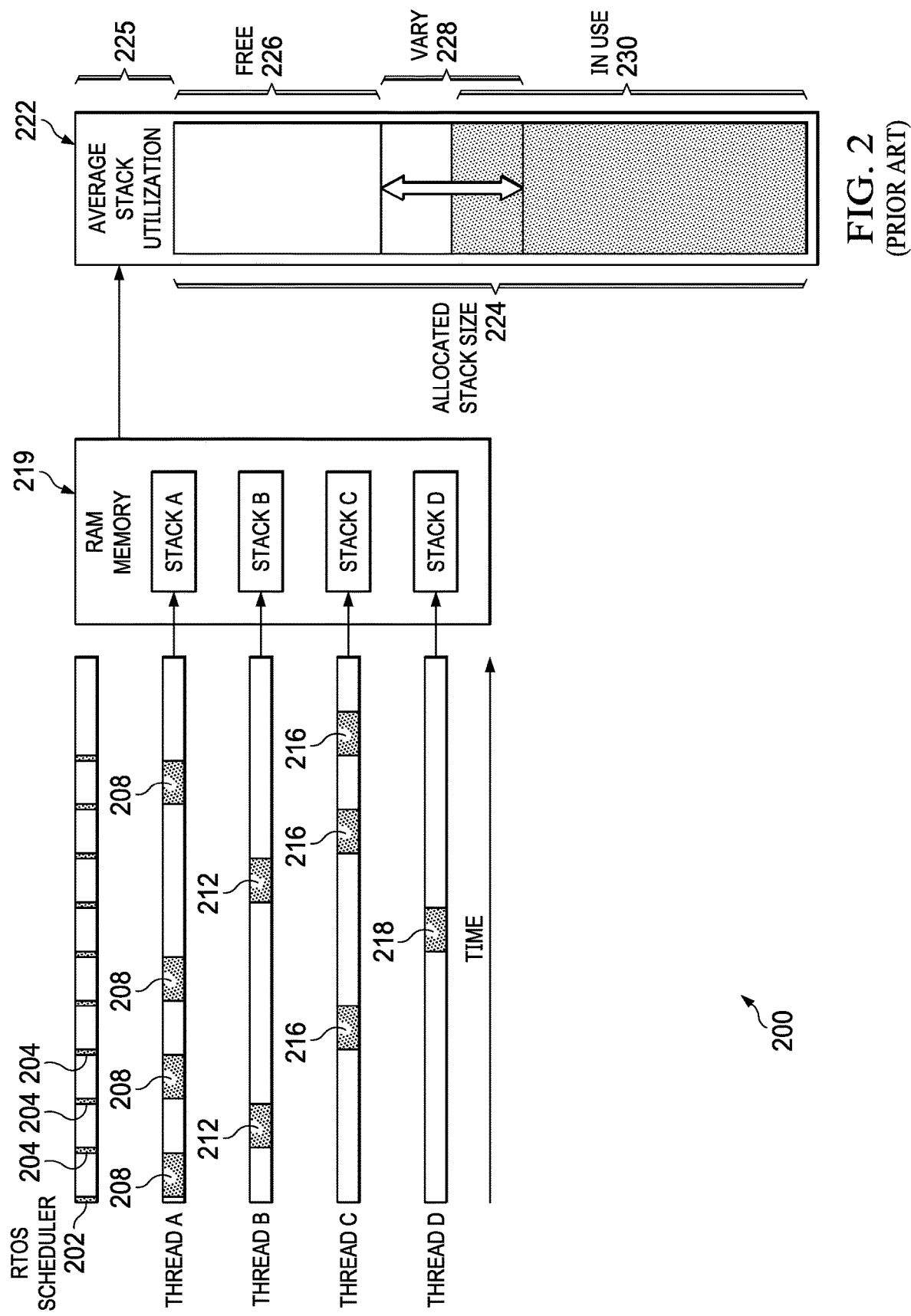
FIG. 2 is a diagram of memory stack management in accordance with a conventional approach.

In another example, a second mapping results in a second sub-set of the memory blocks for a given stack that includes less memory blocks than a first-sub-set of the memory blocks for the given stack. In such case, the stack memory allocation controller 130 is configured to provide a second type of the control signal 152 to the memory block power interface 150, where the second type of the control signal 152 indicates a number of memory blocks to turn off. In response to the second type of the control signal 152, the memory block power interface 150 is configured to change a power state of at least one of the memory blocks 110A-110N from on to off. In some example embodiments, the stack memory allocation controller 130 includes hardware components configured to perform the described operations without affecting the availability of memory blocks for the stacks FIG. 2 is a diagram 200 of memory stack management in accordance with a conventional approach. In the diagram 200, an RTOS scheduler 202 initiates threads A, B, C, and D at scheduled or triggered intervals 204. In the example of FIG. 2, the RTOS scheduler 202 initiates thread A intervals 208, thread B intervals 212, thread C intervals 216, and a thread D interval 218. For each of the thread A intervals 208, there is a respective stack A in RAM memory 219. For each of the thread B intervals 212, there is a respective stack B in the RAM memory 219. For each of the thread C intervals 216, there is a respective stack C in the RAM memory 219. For the thread D interval 218, there is a respective stack D in the RAM memory 219.

The diagram 200 also shows an average stack utilization 222 for each of stacks A-D. As shown, the average stack utilization 222 includes an allocated stack size 224 with a free portion 226, a variable portion 228, and an in use portion 230. The average stack utilization 222 also includes a buffer or delta 225 between the allocated stack size 224 and the average stack utilization 222. The free portion 226 is reserved for peak consumption and is rarely used. In many cases, the size of the free portion 226 is larger than what is needed even for peak consumption as a safety precaution. The buffer or delta 225 between the allocated stack size 224 and the average stack utilization 222 is the amount of memory that could be shared between stacks or saved due to this sharing. In the conventional approach of diagram 200, the average stack utilization 222 for stacks A-D results in the amount of total stack memory allocation being significant. This means that the size of the RAM memory 219 needs to be large enough to support the stack memory allocation, which increases cost. There is a power consumption cost as well.

Figure 3:
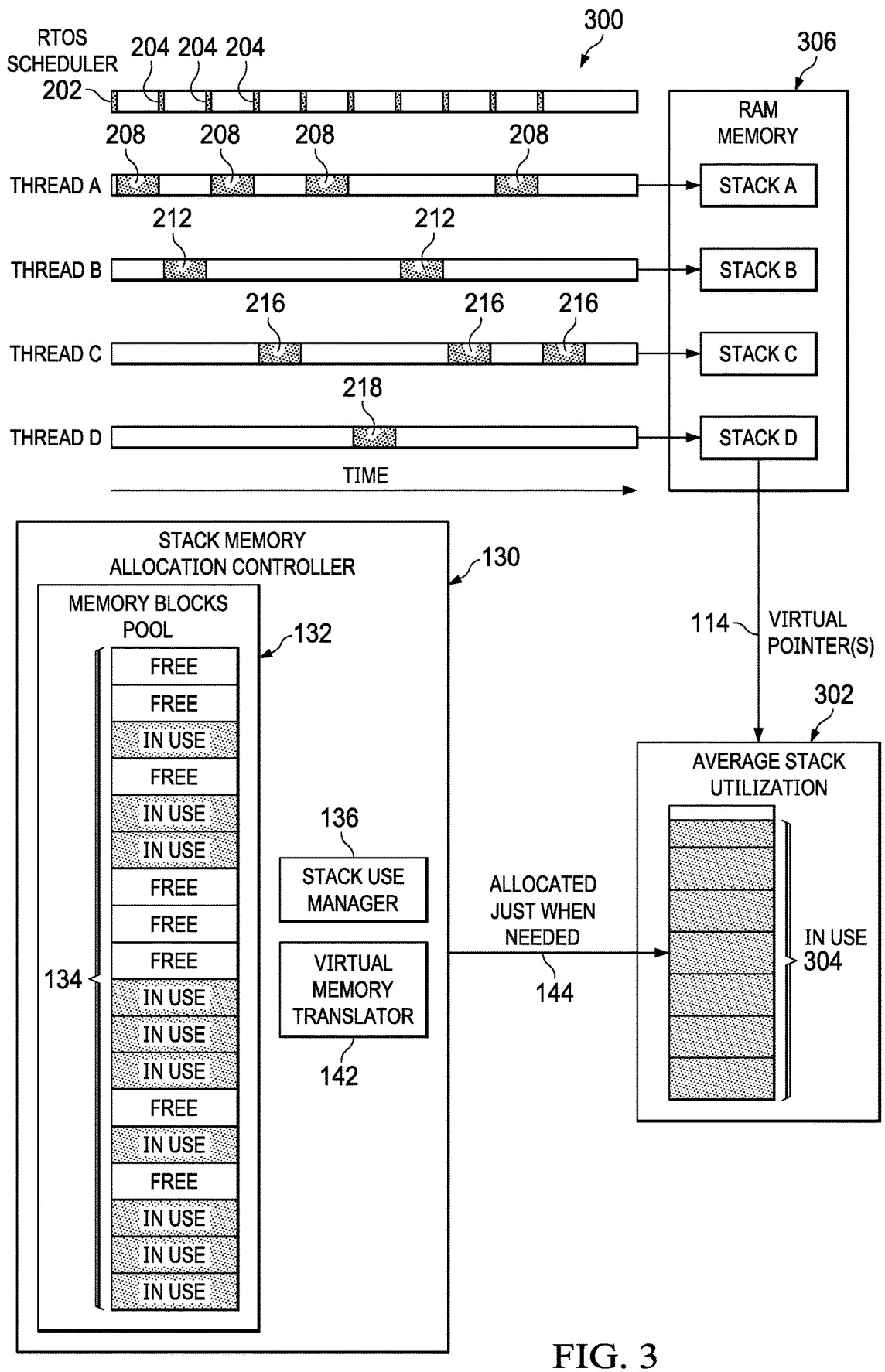
FIG. 3 is a diagram of memory stack management in accordance with an example embodiment.

FIG. 3 is a diagram 300 of memory stack management in accordance with an example embodiment. In the diagram 300, the RTOS scheduler 202 initiates threads A, B, C, and D at the scheduled intervals 204. Again, the RTOS scheduler 202 initiates thread A intervals 208, thread B intervals 212, thread C intervals 216, and the thread D interval 218 at different times. For each of the thread A intervals 208, the thread B intervals 212, the thread C intervals 216, and the thread D interval 218, there is a respective stack A-D in RAM memory 306.

As shown, the diagram 300 includes the stack memory allocation controller 130. As described in FIG. 1, the stack memory allocation controller 130 includes the memory blocks pool 132 with current status 134, the stack use manager 136, and the virtual memory translator 142. With the stack memory allocation controller 130, an average stack utilization 302 based on the current needs of each active thread is achieved for stacks A-D. In some example embodiments, the stack memory allocation controller 130 allocates memory blocks to the stacks A-D responsive to monitored activities (obtained by the monitor 138 in FIG. 1) and a stack utilization target (e.g., the stack utilization target 140 in FIG. 1). As shown, the average stack utilization 302 of FIG. 3 is comparable to the active stack utilization 120 of FIG. 1 and includes a memory block index 304 of "in use" memory blocks. With the virtual memory translator 142, the memory block index 304 is mapped to physical memory blocks for stacks A-D using virtual pointers 114, where the physical memory blocks may be in a sequential address order or spaced from each other.

In some example embodiments, the allocation 144 of memory blocks of the RAM memory 306 by the stack memory allocation controller 130 to provide the average stack utilization 302 is performed responsive to monitored activities (updated as needed) to ensure each stack has enough memory for its current needs. As desired, an extra memory block or some portion of an extra memory block is included with the memory block index 302 . The extra memory block or portion provides some flexibility to the stack memory allocation controller 130 while managing memory block allocation to avoid significant re-allocation overhead. If needed, the extra memory block or portion is re-assignable to another stack responsive to thread prioritization or weights. Such prioritizations or weights may be included with the stack utilization target 140.

In some example embodiments, the stack memory allocation controller 130 provides power consumption aware programming of transparent secure memory allocation that optimizes the total memory allocation for multiple stacks of processor tasks (e.g., stacks A-D in FIG. 3) operating simultaneously. In some example embodiments, the stack memory allocation controller 130 may use virtual memory regions to provide programming transparency to the processor through virtual sequential memory regions while underneath the RAM memory 306 is split into small blocks allocated from different regions (non-sequential memory blocks). In some example embodiments, the stack memory allocation controller 130 is configured to map the stack pointer of a processor thread into a virtual memory region and dynamically allocate/de-allocate memory blocks into a specific stack for the processor thread based on current need responsive to memory access monitoring (e.g. tracking the stack pointer). In some example embodiments, the stack memory allocation controller 130 generates a bus fault in case of stack overflow when a memory block of the RAM memory 306 cannot be allocated to a stack. Also, the stack memory allocation controller 130 may clear or zero previously used memory blocks that are no longer in use to protect the content passed through the stack. In some example embodiments, the stack memory allocation controller 130 controls the power and/or clock to unused memory blocks and retains power and/or clock for "in use" memory blocks.

In some example embodiments, the stack memory allocation controller 130 performs the following functions: 1) provide maximal virtual memory per stack at the time of execution; 2) track stack use by monitoring memory access and instruction fetch; 3) manage RAM memory allocation on-the-fly per stack with the ability to allocate memories from different ranges (non-sequential memory blocks); 4) optional use of different memory types (e.g. GLX, ULL); 5) power-down memory blocks as appropriate; 6) re-arrange already allocated blocks to optimize power consumption; and 7) provide protection on content by clearing or zeroing previously used memory blocks that are no longer in use.

In some example embodiments, the stack memory allocation controller 130 optimizes allocation of memory blocks to stacks by sharing the same memory blocks between different stacks, and generating a bus fault in case of an insufficient memory condition. In other words, the size of the RAM memory 306 of FIG. 3 can be smaller than the size of the RAM memory 219 in FIG. 2, which reduces cost and power consumption. Conventional approaches, as in FIG. 2, do not share the same memory blocks between stacks, which forces developers to allocate more stack memory than the maximum estimated peak consumption. Usually the peak consumption is tens of percent larger than the typical consumption of the thread. With the stack memory allocation controller 130, advantages over the convention approach (see FIG. 2) include: 1) optimal RAM utilization for stack memories in the device level; 2) improved power consumption; 3) improved robustness; 4) improved security (e.g., to prevent Return-Oriented Programming (ROP) attack which allows an attacker to execute code in the presence of security defenses by gaining control of the stack); and 5) simplicity in software development.

Figure 4:
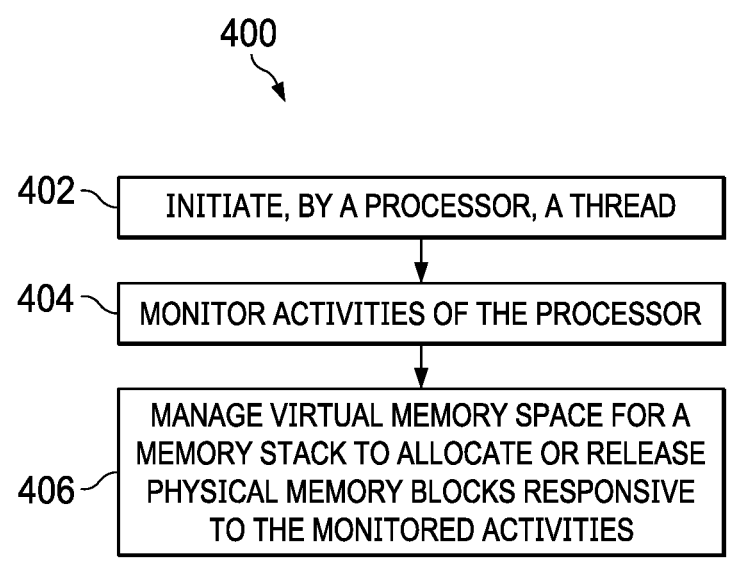
FIG. 4 is a diagram of a method in accordance with an example embodiment.

FIG. 4 is a diagram of a method 400 in accordance with an example embodiment. The method 400 in performed, for example, by an IC (e.g., the IC 100) with a stack memory allocation controller (e.g., the stack memory allocation controller 130 in FIGS. 1 and 3). As shown, the method 400 includes initiate, by a processor (e.g., the processor(s) 102 in FIG. 1), a thread (e.g., one of threads A-D in FIG. 3) at block 402. At block 404, activities of the processor related to the thread are monitored. At block 406, virtual memory space for a memory stack is managed to allocate or release physical memory blocks responsive to the monitored activities. In some example embodiments, managing virtual memory space at block 406 is responsive to the monitored activities and a stack utilization target (e.g., the stack utilization target 140 in FIG. 1) that defines some of the physical memory blocks as shareable memory blocks for different threads executed by the processor.

In some example embodiments, the stack utilization target defines some of the physical memory blocks as non-shareable memory blocks assigned to different threads executed by the processor. In some example embodiments, the stack utilization target limits the physical memory blocks assigned to the thread responsive to a current need determined from the monitored activities. In some example embodiments, the method 400 includes powering down or powering up memory blocks as needed. Another option is to generate a bus fault in case of insufficient memory. Another option is to clear or zero previously used memory blocks that are no longer in use to protect content.

In some example embodiments, an integrated circuit (e.g., the IC 100 in FIG. 1) includes: a processor (e.g., the processor(s) 102 in FIG. 1); and a memory (e.g., the memory 108 in FIG. 1) coupled to the processor, the memory having memory blocks (e.g., memory blocks 110A-110N in FIG. 1). The IC also includes a stack memory allocation controller (e.g., the stack memory allocation controller 130 in FIG. 1) coupled to the processor and the memory. The stack memory allocation controller has a stack use manager (e.g., the stack use manager 136 in FIG. 1) configured to monitor stack activities of a thread being executed by the processor. The stack memory allocation controller also has a virtual memory translator (e.g., the virtual memory translator 142 in FIG. 1). The virtual memory translator is configured to: obtain a first mapping of pointers (e.g., pointers 114 in FIG. 1) to a first sub-set of the memory blocks assigned to a memory stack for the thread; and determine a second mapping of pointers (e.g., the points 114 in FIG. 1) to a second sub-set of memory blocks assigned to the memory stack and different than the first sub-set of memory blocks responsive to the monitored activities.

In some example embodiments, the virtual memory translator is configured to determine the second mapping of pointers responsive to the monitored activities and a stack utilization target (e.g., the stack utilization target 140) provided by the stack use manager. In some example embodiments, the stack utilization target defines some of the memory blocks as shareable memory blocks for different threads executed by the processor. In some example embodiments, the stack utilization target defines some of the memory blocks as non-shareable memory blocks assigned to different threads executed by the processor. In some example embodiments, the stack memory allocation controller is configured to generate a fault responsive to a stack overflow. In some example embodiments, the stack memory allocation controller is configured to clear or zero memory blocks that are not in use. In some example embodiments, the stack utilization target limits the memory blocks assigned to the thread responsive to a current need determined from the monitored activities.

In some example embodiments, the IC includes a memory block power interface (e.g., the memory block power interface 150) coupled to the stack memory allocation controller and the memory. If the second sub-set of the memory blocks (determined by the second mapping of virtual pointers) includes more memory blocks than the first-sub-set of the memory blocks (determined by the second mapping of virtual pointers), the stack memory allocation controller is configured to provide a control signal (e.g., the control signal 152) to the memory block power interface. Also, the memory block power interface is configured to change a power state of at least one of the memory blocks from off to on responsive to the control signal. If the second sub-set of the memory blocks includes less memory blocks than the first sub-set of the memory blocks, the stack memory allocation controller is configured to provide a control signal to the stack memory power interface, where the stack memory power interface is configured to change a power stage of at least one of the memory blocks from on to off responsive to the control signal.

In some example embodiments, a stack memory allocation controller (e.g., the stack memory allocation controller 130 in FIG. 1) includes a first interface (e.g., the first interface 131 in FIG. 1) adapted to be coupled to a memory interface (e.g., the memory interface 104) between a processor (e.g., the processor(s) 102 in FIG. 1) and a memory (e.g., the memory 108 in FIG. 1). The stack memory allocation controller also includes a stack use manager (e.g., the stack use manager 136 in FIG. 1) coupled to the first interface and configured to monitor stack activities of a thread (e.g., one of threads A-D in FIG. 3) being executed by the processor. The stack memory allocation controller also includes a virtual memory translator (e.g., the virtual memory translator 142 in FIG. 1) coupled to the stack use manager. The virtual memory translator is configured to: obtain a first mapping of pointers (e.g., the pointers 114 in FIG. 1) to a first sub-set of memory blocks of the memory assigned to a memory stack for the thread; and determine a second mapping of pointers (e.g., the pointers 114 in FIG. 1) to a second sub-set of memory blocks of the memory assigned to the memory stack and different than the first sub-set of memory blocks responsive to the monitored activities.

In some example embodiments, the stack memory allocation controller also includes a second interface (e.g., the second interface 133 in FIG. 1) adapted to be coupled to a memory block power interface (e.g., the memory block power interface 150 in FIG. 1). In some scenarios (e.g., the second mapping increasing a number of memory blocks allocated to a thread), the stack use manager is configured to provide a control signal (e.g., the control signal 152 in FIG. 1) to the memory block power interface responsive to the second mapping of pointers, where the control signal results in a power state of at least one of the memory blocks being changed from off to on. In other scenarios (e.g., the second mapping decreasing a number of memory blocks allocated to a thread), the stack use manager is configured to provide a control signal (e.g., the control signal 152 in FIG. 1) to the memory block power interface responsive to the second mapping of pointers, where the control signal results in a power state of at least one of the memory blocks being changed from on to off. With the stack memory allocation controller, the size and use of RAM memory for stacks is optimized relative to conventional approaches, which reduces cost and power consumption, while avoiding stack overflows and otherwise providing data security and other benefits.

The term "couple" is used throughout the specification. The term may cover connections, communications, or signal paths that enable a functional relationship consistent with the description of the present disclosure. For example, if device A generates a signal to control device B to perform an action, in a first example device A is coupled to device B, or in a second example device A is coupled to device B through intervening component C if intervening component C does not substantially alter the functional relationship between device A and device B such that device B is controlled by device A via the control signal generated by device A.

Modifications are possible in the described embodiments, and other embodiments are possible, within the scope of the claims.

What is claimed is:

1. A system, comprising:
   a processor configured to execute a set of threads that includes a thread;
   a memory coupled to the processor and comprising a set of memory blocks that includes a memory block allocated to a stack associated with execution of the thread;
   a stack memory allocation controller coupled to the processor and the memory and configured to:
   determine a status of the memory block whether the memory block is being used by the stack of the thread;
   based on that the memory block is being used by the stack of the thread, determine a size of the memory block needed for usage by the stack of the thread;
   based on the determined size of the memory block, determine an adjustment to allocation of the memory block; and
   based on the adjustment to allocation of the memory block, determine a mapping of pointers to a subset of the set of memory blocks, including the memory block, that is being used by the set of threads, not a remainder of the set of memory blocks that is not being used by the set of threads.

2. The system of claim 1, wherein the stack memory allocation controller is configured to:
   obtain a stack utilization target indicating one or more limits associated with allocation of the memory block; and
   determine the adjustment to allocation of the memory block based on the stack utilization target, in addition to the determined size of the memory block.

3. The system of claim 2, wherein the stack utilization target indicates a maximum number of memory blocks allocable to the thread.

4. The system of claim 2, wherein the stack utilization target indicates whether the memory block is shareable between the thread and another thread.

5. The system of claim 1, wherein the stack memory allocation controller is configured to generate a fault responsive to a stack overflow.

6. The system of claim 1, wherein the stack memory allocation controller is configured to:
   based on that the memory block is not being used by the stack of the thread, determine an adjustment to allocation of the memory block to release the memory block.

7. The system of claim 1, wherein the stack memory allocation controller is configured to generate a request for an adjustment of a power state of the memory block based on the adjustment to allocation of the memory block, and wherein the system comprises a memory block power interface configured to adjust the power state of the memory block based on the request.

8. The system of claim 7, wherein the memory block power interface is configured to:
based on the request,
change the power state of the memory block from on to off; or
change the power state of the memory block from off to on.

9. The system of claim 1, wherein the stack memory allocation controller is configured to determine the size of the memory block based on a stack pointer associated with the execution of the thread.

10. The system of claim 1, wherein the stack memory allocation controller is configured to determine the size of the memory block based on a context switch associated with the execution of the thread.

11. A device, comprising:
a stack memory allocation controller comprising:
a memory blocks pool configured to provide a status of a respective memory block of a set of memory blocks of a memory whether the respective memory block is being used by a stack associated with execution of a thread of a set of threads by a processor; and
a stack use manager configured to:
based on that a subset of memory blocks of the set of memory blocks is being used by stacks of the set of threads, for the respective memory block of the subset of memory blocks, determine a size of the respective memory block for usage by the stack of a thread of the set of threads;
based on the determined sizes of the respective memory blocks, determine an adjustment to allocation of the subset of memory blocks; and
based on the adjustment to allocation of the subset of memory blocks, determine a mapping of pointers to the subset of memory blocks being used by the set of threads, not a second subset of the set of memory blocks not being used by the set of threads.

12. The device of claim 11, further comprising a virtual memory translator configured to cause generation of a request for an adjustment of a power state of the subset of memory blocks based on the adjustment to allocation of the subset of memory blocks, and wherein the device comprises a memory block power interface configured to adjust the power state of the subset of memory blocks based on the request.

13. The device of claim 12, wherein the memory block power interface is configured to:
based on the request,
change the power state of a memory block of the subset of memory blocks from on to off; or
change the power state of a memory block of the subset of memory blocks from off to on.

14. The device of claim 11, wherein the stack use manager is configured to determine the sizes of the respective memory blocks based on one or more of: a stack pointer associated with the execution of the set of threads, or a context switch associated with the execution of the set of threads.

15. The device of claim 11, wherein the stack use manager is configured to:
obtain a stack utilization target indicating one or more limits associated with allocation of the subset of memory blocks; and
determine the adjustment to allocation of the subset of memory blocks based on the stack utilization target, in addition to the determined sizes of the respective memory blocks.

16. The device of claim 15, wherein the stack utilization target indicates one or more: a maximum number of memory blocks allocable to a thread, or whether a memory block is shareable by multiple threads.

17. The device of claim 11, wherein the stack use manager is configured to:
based on that one memory block of the set of memory blocks is not being used by a stack of any thread of the set of threads, determine an adjustment to allocation of the memory block to release the memory block.

18. A method, comprising:
determining a status of a memory block of a set of memory blocks of a memory, which is allocated to a stack associated with execution of a thread of a set of threads by a processor, whether the memory block is being used by the thread;
based on that the memory block is being used by the stack of the thread, determining a size of the memory block needed for usage by the stack of the thread;
based on the determined size of the memory block, determining an adjustment to allocation of the memory block; and
based on the adjustment to allocation of the memory block, determine a mapping of pointers to a subset of the set of memory blocks, including the memory block, that is being used by the set of threads, not a remainder of the set of memory blocks that is not being used by the set of threads.

19. The method of claim 18, further comprising:
generating a request for an adjustment of a power state of the memory block based on the adjustment to allocation of the memory block; and
adjusting the power state of the memory block based on the request.

20. The method of claim 18, further comprising:
based on that the memory block is not being used by the stack of the thread, determining an adjustment to allocation of the memory block to release the memory block.

21. The method of claim 18, further comprising obtaining a stack utilization target indicating one or more limits associated with allocation of the memory block, wherein determining the adjustment to allocation of the memory block comprises determining the adjustment based on the stack utilization target, in addition to the determined size of the memory block.

* * * * *